United States Patent [19]
Anderson et al.

[11] 3,900,036
[45] Aug. 19, 1975

[54] CORN HUSKING MACHINE

[76] Inventors: Ronald L. Anderson, 1698 Best Ln., Eugene, Oreg. 97401; Harry T. Kessler, Jr., 4460 Mill, Eugene, Oreg. 97405

[22] Filed: Oct. 3, 1974

[21] Appl. No.: 511,621

[52] U.S. Cl. .................................. 130/5 D; 130/5 B
[51] Int. Cl. ................................................ A01f 7/02
[58] Field of Search ............ 130/5 B, 5 C, 5 D, 5 E, 130/5 F, 5 G, 5 H, 5 J; 56/104

[56] References Cited
UNITED STATES PATENTS

| | | | |
|---|---|---|---|
| 3,113,574 | 12/1963 | Greedy et al. | 130/5 D |
| 3,158,156 | 11/1964 | Cover | 130/5 C |
| 3,250,277 | 5/1966 | Garriott | 130/5 B |

*Primary Examiner*—J. N. Eskovitz
*Attorney, Agent, or Firm*—James D. Givnan, Jr.

[57] ABSTRACT

A vibratory shaker table including discharge chutes each terminating above a pair of inclined husking rolls for removal of vegetable matter from food articles. Panels between each pair of rolls confine the food articles for downward passage along the rolls. Subjacent each chute, and above each pair of rolls is a flexible pad contributing towards desired delivery of the food articles to the rolls while yielding to food articles urged thereagainst by roll action. Each chute is oreintated with respect to its associated rolls so as to direct discharged articles towards the uppermost roll of each pair.

5 Claims, 6 Drawing Figures

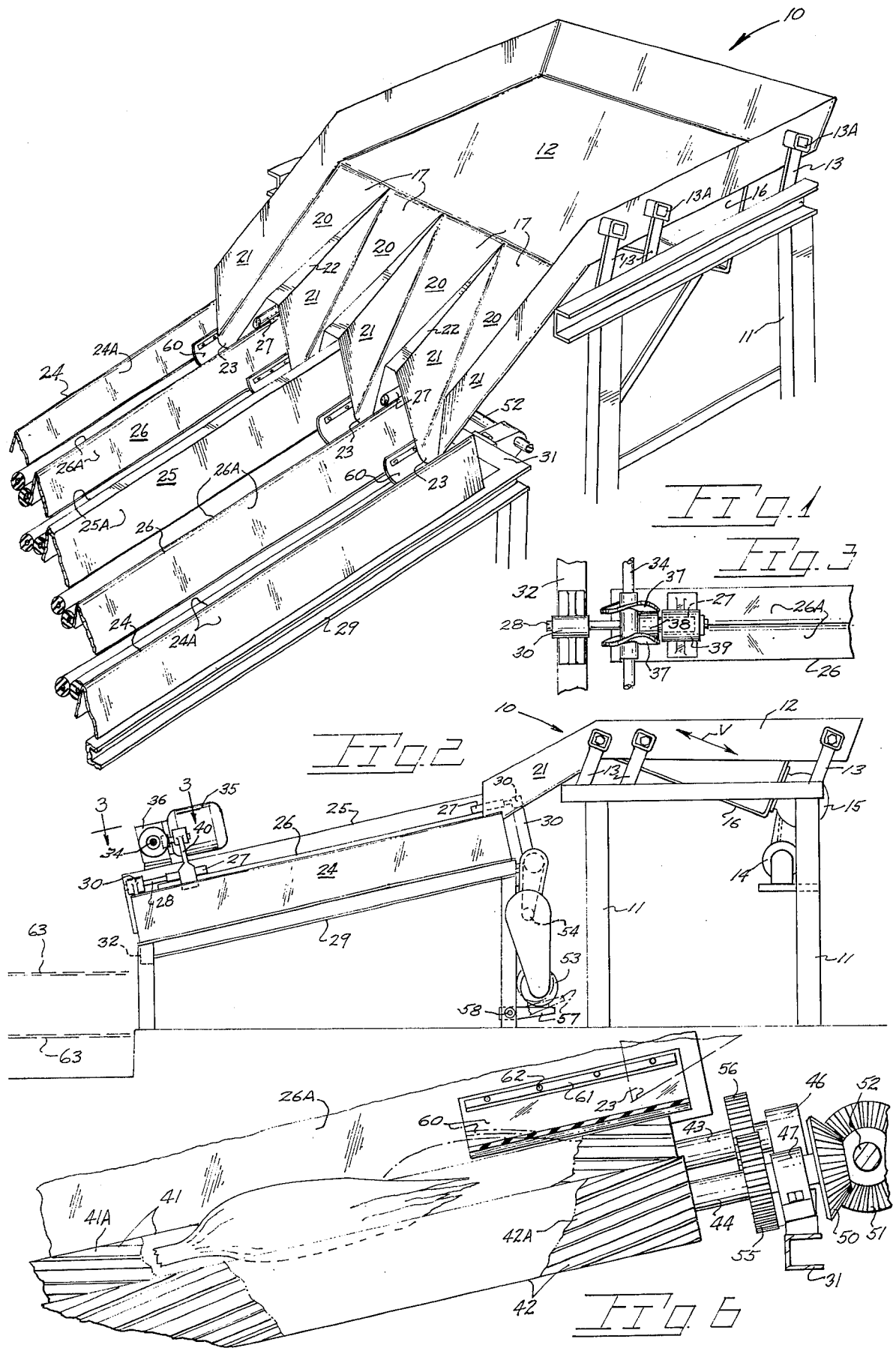

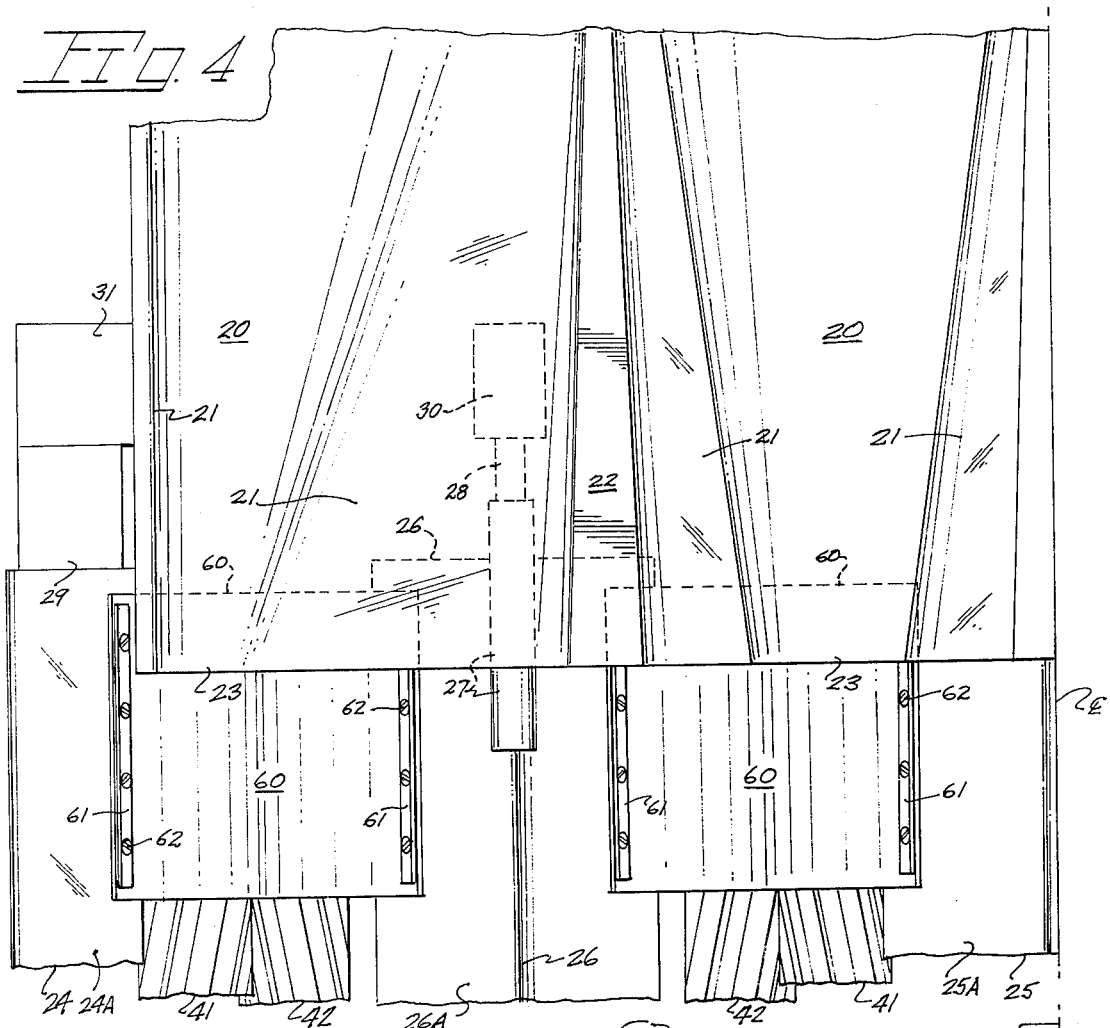
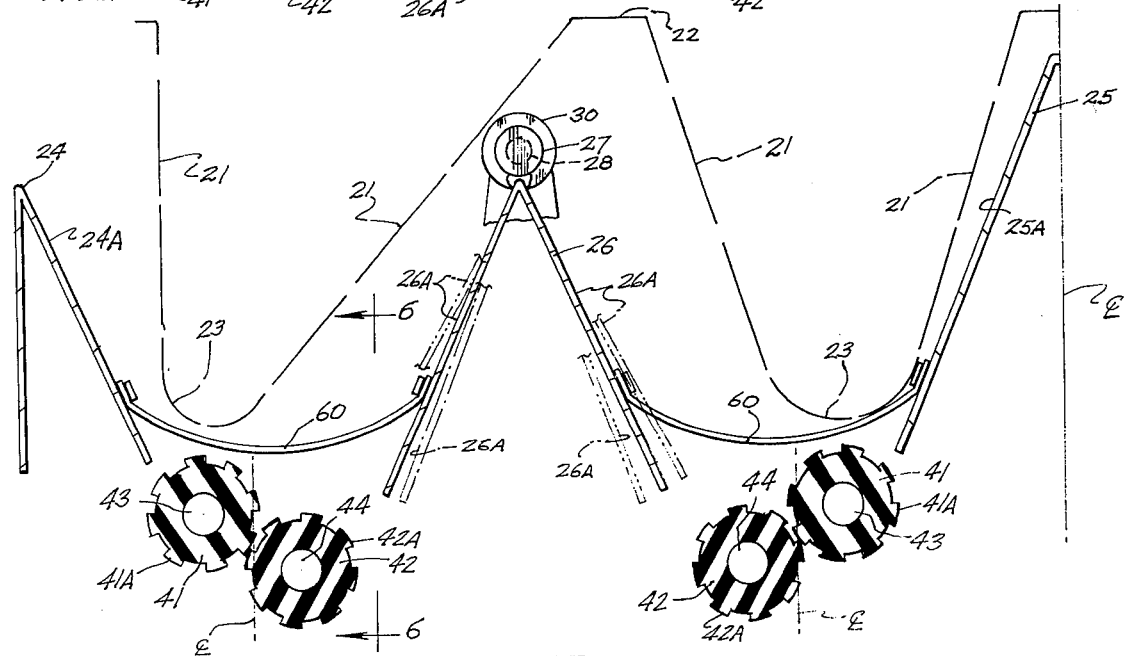

CORN HUSKING MACHINE

BACKGROUND OF THE INVENTION

The present invention relates to food processing equipment and more particularly to equipment for removing matter from a food article such as the husk from an ear of corn.

Food processing plants have for some time utilized mechanized equipment for the stripping of the husks from harvested ears of corn. Prior to such equipment, and still practiced to a considerable extent, husking of corn was accomplished by a battery of workers stationed along a conveyor line. An important advantage of manual husking is the very low damage ratio as compared with the damage ratio experienced by those processors using mechanical huskers.

Equipment presently utilized in corn husking includes counter rotating, ribbed rolls which pull the husk from the ear of corn. The ears are centrally deposited onto the rolls from chutes desirably in a large end first manner. Significant problems are encountered in the transition between the chute and the receiving portion of the husking rolls. For example, ears of corn deposited on the rolls in an end first manner are destroyed by passage downwardly between the rolls resulting in severe wear on the rolls and associated power train. To prevent such end first deposit, inclined plate members have been installed in the transition zone at the chute end in an effort to accomplish desired lengthwise deposit of the corn ear onto the pair of counter rotating husking rolls. While such plate members have alleviated the problem somewhat, a problem has arisen by reason of concerted roll action propelling the ear of corn "upstream" into damaging contact with the plate edge causing same to penetrate through the husk and into the corn kernels.

SUMMARY OF THE INVENTION

The instant invention is embodied within the novel combination of a shaker table feed chute, a flexible transition pad member and their orientation with respect to subjacent husking rolls.

A shaker table receives unhusked ears of corn and successively directs same, large end first, downwardly through shaker table feed chutes which are offset with respect to a pair of husking rolls for the purpose of depositing the corn ear primarily on one of said rolls. Additionally important to the present invention is the flexible pad interposed between the feed chute end and the upper end of a pair of rolls to accomplish desired ear deposit on the rolls while avoiding ear damage subsequent to roll deposit. As earlier noted, a distinct advantage is found to exist in depositing the corn ear in substantial alignment with the roll as opposed to end first deposit. Importantly, the flexible pad accomplishes this function while additionally yielding to ears of corn coming into roll propelled, edge contact with same.

Objects of the present invention include: the provision of a novel combination of a shaker table with delivery chutes each offset with respect to pairs of husking rolls contributing towards optimum discharge of a corn ear on said rolls; the provision of said offset delivery chute with a flexible pad member which contributes toward longitudinal deposit of the ears of corn on husking rolls; the provision of a flexible pad member which yields to ears of corn forced thereagainst by cooperating husking rolls; the provision of a flexible transition pad supported along at least one of its sides by a moving panel whereby alternate rapid raising and lowering of the pad imparts an upwardly directed force to the passing corn ear to discharge same onto the rolls to avoid jamming of the ears; the provision of shaker table delivery chutes having their discharge ends disposed above an elevated husking roll facilitating desired deposit of the corn ear on the husking rolls.

BRIEF DESCRIPTION OF THE DRAWINGS

In the accompanying drawings:

FIG. 1 is a perspective view of a shaker table having discharge chutes terminating superjacent pairs of husking rolls with interposed panels confining food articles on the rolls, FIG. 2 is a side elevational view of the corn husking machine shown in FIG. 1, FIG. 3 is a plan view taken along line 3—3 of FIG. 2 showing details of a panel oscillating mechanism, FIG. 4 is a plan view of the discharge ends of shaker table chutes broken away along a centerline with flexible transition pads and husking roll end segments disposed therebelow, FIG. 5 is an elevational view of FIG. 4 showing the chute, pad and roll offset relationship, and FIG. 6 is a sectional view taken along line 6—6 of FIG. 5.

DETAILED DESCRIPTION OF THE PREFERRED EMBODIMENT

With continuing reference to the accompanying drawings wherein applied reference numerals indicate parts similarly identified in the following specification, the reference numeral 10 indicates generally a shaker table onto which are deposited ears of harvested corn from conveyor means not shown. A supporting framework 11 of the table supports a vibratory shaker table tray 12 by means of shock-mounted supports 13 having resilient cores 13A at their upper and unseen lower ends. The surface of tray 12 is slightly inclined from rear to front to achieve large end first entry of the ears into the following described chutes.

With reference to FIG. 2, framework 11 supports an electric motor 14 in driving engagement by suitable power transmission means with a vibratory unit 15 disposed below and attached to shaker table tray 12 by means of a mounting plate 16. Vibratory motion is accordingly imparted to shaker table tray 12 along an inclined vector V (approximately 20° inclination) resulting in tray movement in a like direction. Integral with shaker table tray 12 are chutes 17 each defined by a bottom wall 20, side walls 21 with intermediate ridges 22. Each chute terminates downwardly in a discharge lip 23 of arcuate shape which in conjunction with the lowermost portions of side walls 21 corresponds generally to the cross sectional curvature of an ear of unhusked corn. Accordingly, ears of corn deposited in shaker tray 12 migrate up the gently inclined tray surface (approximately 5°) toward entry into chutes 17 with the ear entering the chute area large end first, in most instances, for travel down the chute.

Of importance in the present invention, and best viewed in FIGS. 4 and 5, is the offset of each chute lip towards the uppermost roll of each pair of rolls. Each chute 17 terminates downwardly intermediate a pair of panels which serve to confine the discharged articles for passage down a pair of later described husking rolls. Stationary side panels are indicated at 24 in FIG. 5 while a stationary center panel is indicated at 25. Intermediate oscillating panels at 26 are evenly spaced between the stationary side and center panels and hence each pair of husking rolls is associated with at least one oscillating panel 26. Each of the panels includes, respectively, inclined, longitudinal wall surfaces 24A, 25A and 26A extending lengthwise adjacent a husking roll confining ears of corn thereon for lengthwise travel therealong.

In the disclosed panel arrangement, side panels 24 are mounted in a stationary manner on a second table 29 as is center panel 25 while oscillating panels 26 include hangers 27 FIGS. 1 and 4) within which are received spindles 28 mounted within spindle supports 30. The arrangement shown in FIG. 4 is typical of both ends of oscillating panels 26 with the spindle supports 30 resting upon crossmembers 31, 32 of roll supporting table 29. Accordingly, each panel 26 may move about the axis of inclined spindles 28 toward and away from stationary center panel 25 and side panels 24 with extremes of travel shown in dashed lines of FIG. 5.

Imparting oscillating motion to panels 26 is a powered shaft 34, driven by an electric motor 35 through a speed reducer 36 all suitably mounted on roll table 29 with shaft 34 provided with pairs of cam plates 37. As best viewed in FIG. 3, each pair of cam plates actuate a follower 38, journalled at 39, to which is imparted horizontal reciprocal motion which is translated into panel oscillations about spindles 28 by means of an upright arm 40 affixed to the panel ridge.

Also supported on crossmembers 31 and 32 of roll supporting table 29 are pairs of husking rolls each including upper and lower husking rolls 41 and 42. Each roll is of durable resilient material such as neoprene and includes helical lands 41A, 42A which upon counter rotation of the rolls cooperate to strip the corn husks. Roll shafts 43, 44, in FIG. 6, are journalled as at 46, 47 in crossmember mounted bearings which is typical of the unseen roll ends. For powering each pair of rolls, a roll shaft of a pair is provided with a bevel gear 50 enmeshed with a companion bevel gear 51 mounted on a powered shaft 52. A motor 53 drives suitably journalled shaft 52 through a speed reduction arrangement 54. With continuing reference to the typical view of FIG. 6, roll shaft 44 carries a spur gear 55 enmeshed with a spur gear 56 to impart counter rotation to remaining roll 41. To alleviate sudden loads on the above described roll drive system, a motor at 57 is pivotally attached at 58 to the table frame to permit momentary upward motor displacement in the event of a sudden load on the roll drive train by a temporary obstruction between the rolls.

With attention to FIG. 5, it will be seen that each chute 17 and particularly its lip 23 is offset from the centerline CL of each pair of rolls towards upper roll 41 to discharge the passing article towards the upper roll and away from roll conveyance.

Of importance to the present invention is the utilization of a flexible chute to roll transition pad at 60 attached at its edges to opposing panels and receiving the successively discharged ears of corn for guidance toward the uppermost roll 41 of each roll pair. With combined attention to FIGS. 4 and 5, the pads are mounted to the receiving ends of the stationary and oscillating panels 24, 25 and 26 by plates 61 and fasteners 62 with each pad having a portion in close proximity to upper roll 41 and disposed directly below chute lip 23. Each transition pad may be suitably embodied within a two-ply thickness of belting having at least one rubber coated surface with a suitable pad being approximately of ⅛ inch thickness. As viewed in FIG. 6, it is not uncommon for ears of corn upon deposit on the counter rotating rolls to initially travel upwardly a limited distance to the broken line position shown with the result that the heretofore used metal plates exerted a sawing action on the corn ear severely damaging same. The resilient pad 60, in addition to receiving and directing the deposited ear onto the uppermost roll 41, simply flexes upwardly to permit such limited passage of the ear without damage to same. Those ears which move upwardly along the rolls do so only to a very limited extent, approximately the FIG. 6 broken line position, at which time husking is completed and the ear starts its downward passage to the discharge end of said rolls with no damage being imparted to the kernels. Husked ears are received by a conveyor 63 for further processing.

During oscillation of panels 26, the pads 60 will be alternately drawn towards a flat condition and relaxed to a curvilinear configuration (in section) from the full line medial position shown in FIG. 5. The rapid oscillation of panel 26 imparts an upwardly directed force to a passing ear deposited upon the pad by the offset chute lip 23. Accordingly, the upward force imparted to the ear combined with the ears velocity results in the ear being discharged onto uppermost roll 41 in a trajectory substantially parallel to the roll axis to assure lengthwise deposit of the entire ear on said uppermost roll. Importantly, end first deposit intermediate upper and lower rolls is avoided reducing the damage ratio and saving the equipment from severe momentary loads. Subsequent to deposit of the ear on upper roll 41, counter rotating roll 41 delivers same to the convergence area between the rolls where concerted roll action strips the husks from the ear. Opposing panels 24, 25 and 26 are spaced apart a distance somewhat greater than two ear diameters to permit the passage of ears past a momentarily stopped ear.

While we have shown but one embodiment of the invention it will be apparent to those skilled in the art that the invention may be embodied still otherwise without departing from the spirit and scope of the invention.

Having thus described the invention what is desired to be secured under a letters Patent is:

1. In a food article processing machine having a plurality of chutes down which elongate food articles travel during processing, pairs of upper and lower inclined rolls acting jointly on the chute delivered articles, pairs of elongate panels oppositely adjacent each pair of cooperating rolls confining food articles for passage along the rolls during which passage material is removed from each article by concerted roll action, means powering said rolls, the improvement comprising, flexible pad members mounted intermediate each pair of panels, said pad members located subjacent the discharge end of each chute for reception of chute discharged food articles, at least one panel of each pair of panels being pivotally mounted on said machine and subjected to oscillating motion, said flexible pad members partaking of said motion and operable to discharge the elongate food articles lengthwise on their sides upon the uppermost roll of each pair of inclined rolls to initiate removal of material from the article, said flexible pad members additionally serving to yield to a food article momentarily propelled thereagainst by roll action thereby avoiding article damage.

2. The improvement as claimed in claim 1 wherein the centerline of each pair of inclined rolls is offset relative to the chute associated therewith so as to locate the uppermost roll of each pair in a vertical plane common to the discharge end of the chute so as to receive food articles discharged from the chute and its subjacent flexible pad.

3. The improvement as claimed in claim 1 wherein said flexible pad members are formed of pliable, rubberized material.

4. The improvement as claimed in claim 3 wherein said flexible pad members are substantially rectangular in shape and secured along one of their edges to a stationary panel and along an opposite edge to an oscillating panel, the sectional configuration of the panel changing with panel oscillations to impart motion to the passing food articles along upright vectors.

5. The invention claimed in claim 1 wherein means powering said rolls includes a motor mount, a motor, flexible power transmission means and drive components in driving connection with pairs of upper and lower inclined rolls, the further improvement of pivot means attaching one end of the motor mount to the machine, the remaining end of said mount supported by the flexible power transmission means coupled with the motor output shaft whereby upon the rolls encountering sudden loads the motor is automatically and momentarily elevated to alleviate loading of the motor output shaft and drive components.

* * * * *